(12) United States Patent
Dei et al.

(10) Patent No.: US 8,181,991 B2
(45) Date of Patent: May 22, 2012

(54) INSTRUMENT PANEL WITH POSITIVE LOCKING CAPABILITIES

(75) Inventors: Haruyuki Dei, Ann Arbor, MI (US);
Robert Joseph Panek, Canton, MI (US);
Phouvadol Peter Khouphongsy, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 13 days.

(21) Appl. No.: 12/469,717

(22) Filed: May 21, 2009

(65) Prior Publication Data
US 2010/0295285 A1 Nov. 25, 2010

(51) Int. Cl.
*B60R 21/045* (2006.01)
(52) U.S. Cl. .............. 280/752; 280/751; 24/295
(58) Field of Classification Search .......... 280/751, 280/752; 296/70, 72, 187.05; 24/295
See application file for complete search history.

(56) References Cited

U.S. PATENT DOCUMENTS

| | | | | |
|---|---|---|---|---|
| 4,709,943 | A * | 12/1987 | Yoshimura et al. | 280/751 |
| 5,413,379 | A * | 5/1995 | Koma | 280/752 |
| 5,456,494 | A | 10/1995 | Witkovsky | |
| 5,662,375 | A * | 9/1997 | Adams et al. | 296/214 |
| 5,927,755 | A | 7/1999 | Matsuo et al. | |
| 6,431,600 | B1 | 8/2002 | Freisler et al. | |
| 6,481,682 | B2 * | 11/2002 | Miura | 248/231.9 |
| 6,604,780 | B2 * | 8/2003 | Lee | 296/192 |
| 6,648,402 | B2 | 11/2003 | Scheib et al. | |
| 6,837,518 | B2 | 1/2005 | Mullan | |
| 7,159,685 | B2 * | 1/2007 | Knight-Newbury et al. | 180/274 |
| 7,261,318 | B2 * | 8/2007 | Enders | 280/732 |
| 7,331,606 | B2 | 2/2008 | Riefe et al. | |
| 7,354,102 | B2 * | 4/2008 | Cave et al. | 296/209 |
| 7,735,865 | B2 * | 6/2010 | Cappabianca et al. | 280/752 |
| 2002/0100146 | A1 * | 8/2002 | Ko | 24/295 |
| 2003/0184070 | A1 | 10/2003 | Vidal et al. | |
| 2004/0056463 | A1 | 3/2004 | Marks et al. | |
| 2006/0038389 | A1 | 2/2006 | Ko | |

(Continued)

FOREIGN PATENT DOCUMENTS

JP 7172255 7/1995
(Continued)

OTHER PUBLICATIONS

Tajima et al., Knee Protector, Oct. 13, 2005, JPO, JP 2005-280467 A, English Abstract.*
Tajima et al., Knee Protector, Oct. 13, 2005, JPO, JP 2005-280467 A, Machine Translation of Description.*

*Primary Examiner* — Eric Culbreth
*Assistant Examiner* — James English
(74) *Attorney, Agent, or Firm* — Gifford, Krass, Sprinkle, Anderson & Citkowski, P.C.

(57) ABSTRACT

An instrument panel assembly having a locking feature. The instrument panel assembly includes an elongated member attached to a portion of the vehicle and extending towards the instrument panel assembly, a lower panel spaced apart from the elongated member, at least one clip disposed on one of either the lower panel or the elongated member; and a corresponding number of tabs disposed on the other of said lower panel or said elongated member. The clip and tabs are spaced apart from and registered to each other so as to lockingly engage each other and keep the lower panel in contact with the elongated member when the lower panel and elongated member are driven into contact with each other.

6 Claims, 4 Drawing Sheets

U.S. PATENT DOCUMENTS

| | | | |
|---|---|---|---|
| 2006/0226645 A1* | 10/2006 | Iwasaki | 280/752 |
| 2007/0222197 A1* | 9/2007 | Makita et al. | 280/752 |
| 2009/0008956 A1* | 1/2009 | Scheib et al. | 296/70 |
| 2009/0026747 A1* | 1/2009 | Schaupensteiner | 280/752 |

FOREIGN PATENT DOCUMENTS

| | | | |
|---|---|---|---|
| JP | 9309394 | | 12/1997 |
| JP | 2005280467 A | * | 10/2005 |
| JP | 2008001226 | | 1/2008 |
| JP | 2009079649 A | * | 4/2009 |

* cited by examiner

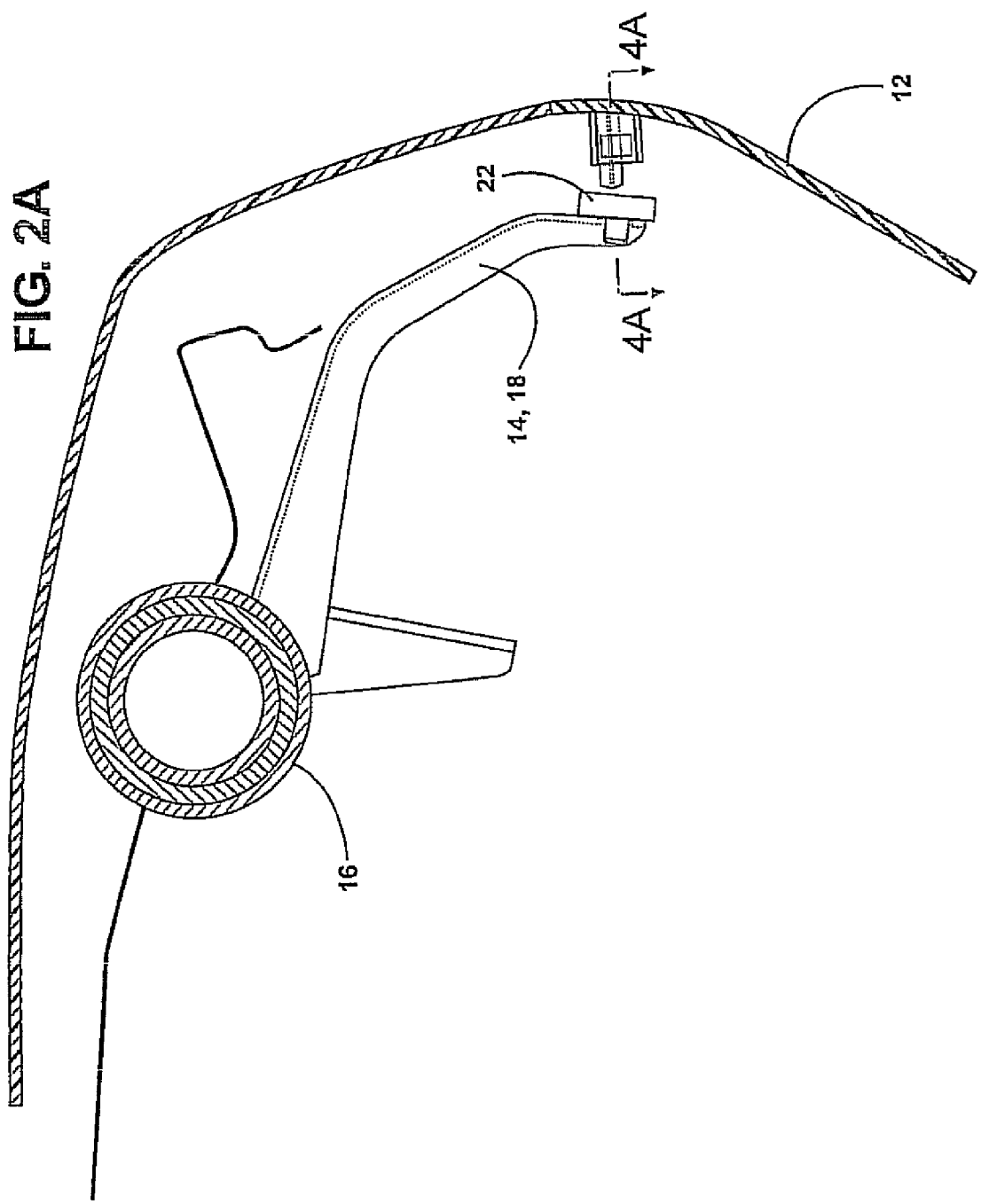

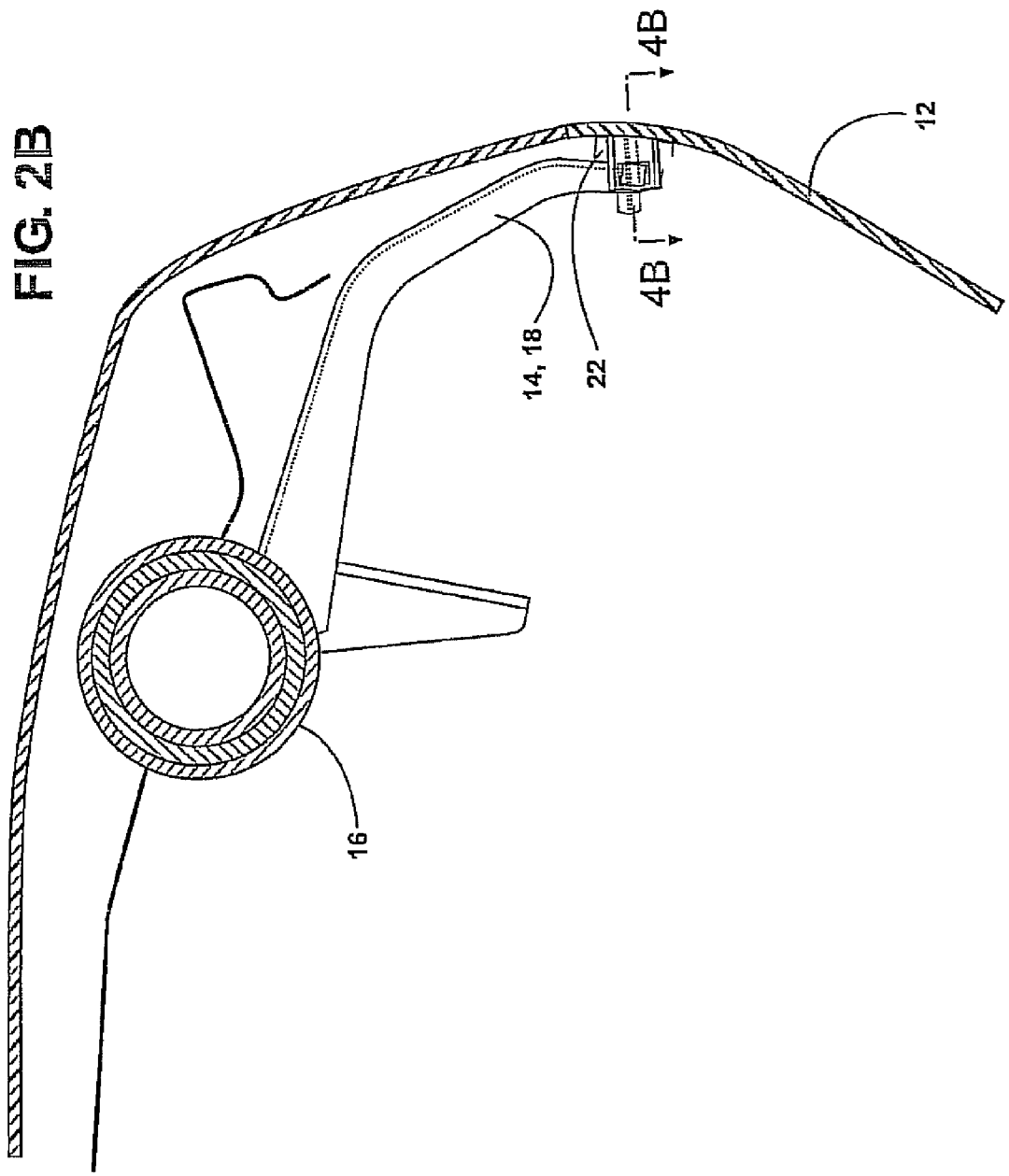

INSTRUMENT PANEL WITH POSITIVE LOCKING CAPABILITIES

FIELD OF THE INVENTION

The present invention relates generally to an instrument panel with a positive locking feature so as to secure the instrument panel to a vehicle structure such as an energy absorbing structure or a knee bolster structure. Specifically this invention relates to a clip and tab arrangement that locks the instrument panel to a vehicle structure after the instrument panel is forced into contact with the vehicle structure.

BACKGROUND OF THE INVENTION

Most automotive vehicles are equipped with an instrument panel. The instrument panel serves to help cushion the impact felt by an occupant during a vehicle crash. The instrument panel also serves an aesthetic purpose, namely to cover the electronics and mechanical components which comprise the interior of the vehicle. For instance, the steering column will have circuitry attached thereto to provide sensory control. Also, fuse boxes and things of that nature are located and hidden within the instrument panel. During impact a passenger's knee or body may be forced forward and into the instrument panel. This impact creates a reactionary force on the occupant's body part. Such force is commonly known to be dissipated through various devices in the art such as a knee bolster.

For instance, U.S. Pat. No. 7,331,606 to Riefe et al. discloses an apparatus and method for absorbing energy in response to a vehicle crash which includes a knee bolster, the knee bolster having at least one breakaway portion, the breakaway portion formed by a bead formed on the interior of the instrument panel. The bead is strategically placed so as to be adjacent to the predicted area in which a knee will impact. As the knee impacts the knee drives the instrument panel inwardly and eventually the instrument panel will break along the beads so as to help absorb the energy from the occupant's knee.

U.S. Pat. No. 6,837,518 to Mullan discloses an energy absorbing knee bolster. The knee bolster has a U-shaped bracket wherein the prongs of the "U" support the knee bolster panel. The knee bolster panel is configured so as to make contact or absorb contact from an occupant's knee and then drive the two prongs inwardly towards each other so as to absorb energy from the impact. The impact causes a portion of the lower instrument panel to break away from the instrument panel assembly. This results in a less efficient transfer of kinetic energy.

Thus it is desirable to have the lower panel maintain structural integrity, i.e. the lower panel does not break away after impact. However, if the lower panel is positively and lockingly engaged so as to remain flush with the instrument panel assembly, then subsequent maintenance on mechanical and electrical components such as the steering column or the fuse box will require that the panel be disengaged. Thus a vehicle owner will replace the entire instrument panel assembly which will then increase the cost of maintenance because the lower panel is lockingly fixed to the vehicle. Accordingly it is desirable to have an instrument panel assembly wherein the lower instrument panel is able to be lockingly engaged with the vehicle upon collision but yet allows the instrument lower panel to be removed so that maintenance may be performed without having to replace the entire panel.

SUMMARY OF THE INVENTION

An instrument panel assembly having a locking feature is provided. The instrument panel assembly includes an elongated member attached to a portion of the vehicle and extending towards the instrument panel assembly, wherein the lower panel is spaced apart from the elongated member. In a first preferred embodiment, the elongated member is an energy absorbing structure extending from the instrument panel reinforcement bar towards the lower panel. In a second preferred embodiment the elongated member is a knee bolster bracket. At least one clip disposed on one of either the lower panel or the elongated member; and a corresponding number of tabs disposed on the other of said lower panel or said elongated member is provided so as to lockingly engage the lower panel with the elongated member. The clip and tabs are spaced apart from and registered to each other so as to lockingly engage each other and keep the lower panel in contact with the elongated member when the lower panel and elongated member are driven into contact with each other.

BRIEF DESCRIPTION OF THE DRAWINGS

FIG. 2a is a cross-sectional view of the instrument panel assembly prior to impact from a predetermined load;

FIG. 2b is a view of FIG. 2a after impact from a predetermined load, as shown the clip and tab lockingly engaged each other so as to prevent the lower panel from breaking away from the instrument panel assembly;

DETAILED DESCRIPTION OF THE INVENTION

Figure 1:
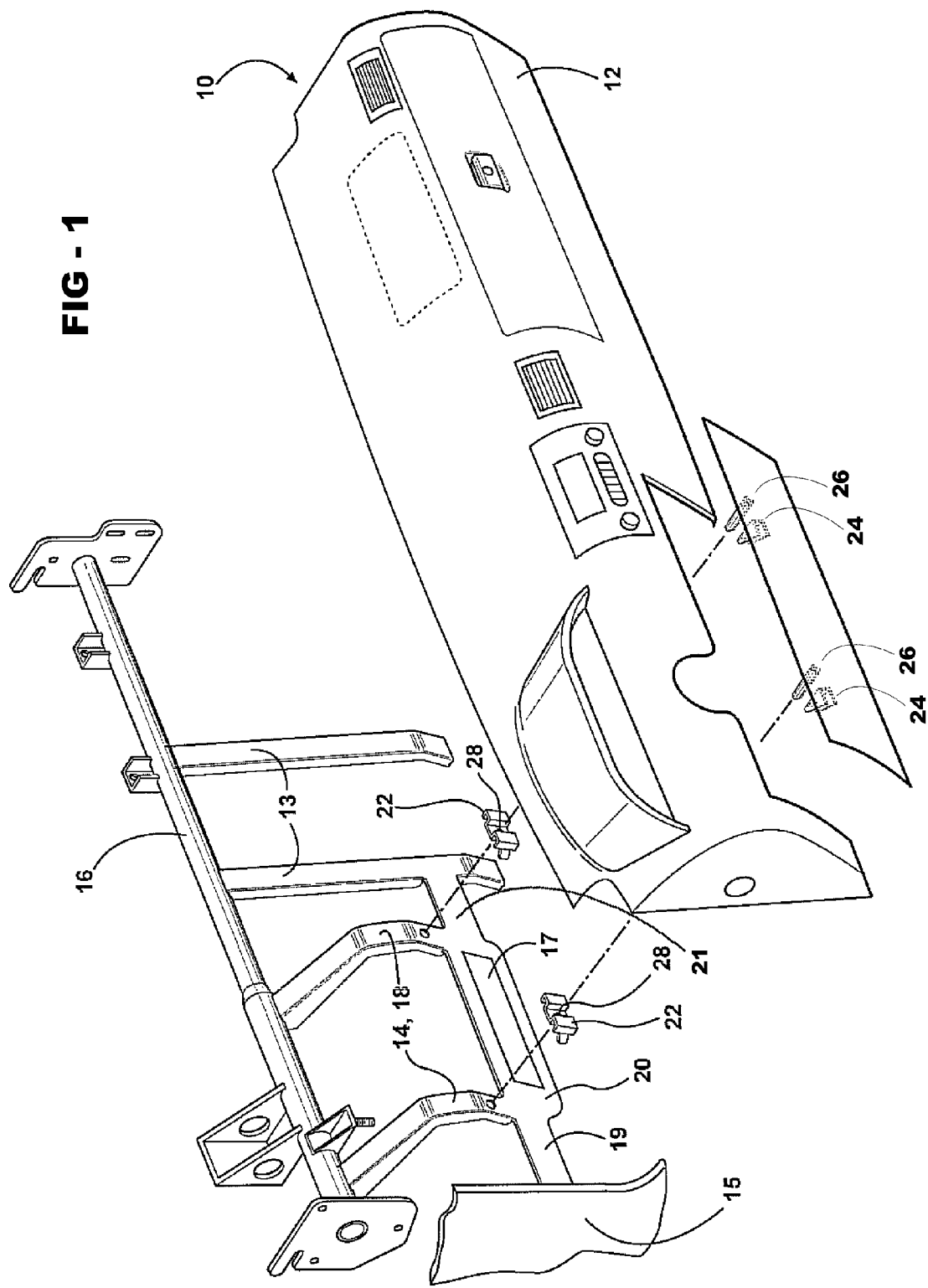
FIG. 1 is an exploded view of an instrument panel assembly, and an instrument panel reinforcement bar of a vehicle having a locking feature.

Referring to the Figures, wherein like numerals indicate corresponding parts throughout the several views, an instrument panel assembly 10 is provided. The instrument panel assembly 10 has a lower panel 12. The lower panel 12 is exposed to the interior compartment of the vehicle so as to be seen from the cabin space. The lower panel 12 is spaced apart and opposite an elongated member 14 extending towards the lower panel 12. The instrument panel assembly 10 covers the structural and electrical components of the vehicle so as to make the cabin space aesthetically pleasing to the occupants. The lower panel 12 is removable from the instrument panel assembly 10 so as to allow access to perform maintenance on the components in which the instrument panel assembly 10 covers.

The elongated member 14 is attached to a secure part of the vehicle such as the instrument panel reinforcement bar 16 or the A-pillar. The instrument panel reinforcement bar 16 extends across the width of the vehicle and forms part of the vehicle frame for supporting vehicle components. The elongated member 14 may be either an energy absorbing structure 18, a knee bolster bracket 20, or the like.

The energy absorbing structure 18 extends outwardly from the instrument panel reinforcement bar 16 and is configured to collapse upon impact of a predetermined load so as to absorb energy of an impact from an occupant body part onto the structure of the energy absorbing structure 18 itself. As shown in FIG. 1, the vehicle includes a pair of energy absorbing structures spaced apart from each other. The energy absorbing structures are located in the driver side of the vehicle and may be attached to the knee bolster bracket.

The knee bolster bracket includes a housing 17 for storing either a knee airbag or knee bolster panel, a first member 19 and a second member 21. The first member 19 may be attached directly to the driver side a-pillar 15 so as to support the knee bolster bracket 20. The second member 21 is secured to a center stack bracket 13.

The instrument panel assembly 10 further includes at least one clip 22 and a corresponding number of tabs 24 registered to receive each clip 22. The clips 22 may be disposed one of either the driver side lower panel 12 or the elongated member 14, and the tabs 24 are disposed opposite the clips 22 on the other of the driver side lower panel 12 or the elongated member 14. It is also anticipated that the arrangement of the clips 22 and tabs 24 may be such that the elongated member 14 includes a combination of clips 22 and tabs 24 and the driver side lower panel 12 includes a reciprocating combination of clips 22 and tabs 24 wherein the clips 22 and tabs 24 of the driver side lower panel 12 are each registered to a corresponding clip 22 and tab 24 of the elongated member 14.

Figure 4A:
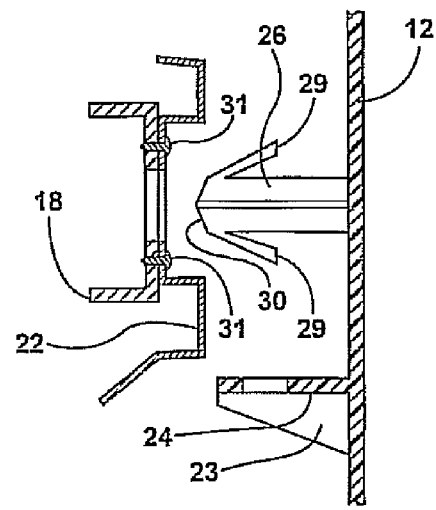
FIG. 4a is a cross-sectional view of the instrument panel assembly of FIG. 2a taken along lines 4a, as shown the clip is spaced apart and registered to the tab.
Figure 4B:
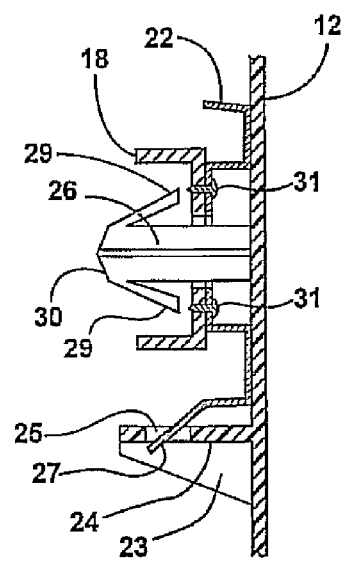
FIG. 4b is a cross-sectional view of the instrument panel assembly of FIG. 2b taken along lines 4a, as shown the clip is lockingly engaged with the tab.

As shown in FIG. 1, a pair of clips 22 and tabs 24 are presented. Specifically the figure shows one clip 22 on each of the energy absorbing structures 18 and a corresponding tab 24 on portions of the instrument panel assembly 10 registered to a perspective clip 22. The clip 22 and tabs 24 are configured to lockingly engage each other, in a manner known in the art as positively locking. As understood by those in the art, positive lock means that once the clip 22 and tab 24 engage each other they are not removable. As shown in FIGS. 4a and 4b, the clip 22 is disposed opposite and spaced apart from the tab 24. When a load from an occupant drives the clip 22 towards the tab 24, the clip 22 and tab 24 engage each other and then are positively locked. Thus the clip 22 must be registered to receive the tab 24.

The instrument panel assembly 10 may further include a locator pin 26 for engaging an aperture 28. Though FIGS. 2a and 2b show the locator pin 26 disposed adjacent the tab 24 on the instrument panel assembly 10, and the aperture 28 disposed on the energy absorbing structure 18, it is anticipated that the locator pin 26 may be disposed on the knee bolster bracket 20 and the aperture 28 disposed on the lower panel 12 spaced apart and opposite the locator pin 26. What is intended is that the locator pin 26 and aperture 28 are spaced opposite and registered to each other so as to help guide the clips 22 and tabs 24 into a locking engagement with each other. The locator pin 26 has a beveled head 30 so as to help ensure that the aperture 28 is able to fully receive the locator pin 26. The locator pin 26 may further include a pin flange 29. The pin flange 29 is pushed through the aperture 28 and helps lock the lower panel 12 to the elongated member 14.

With reference now to FIGS. 2a and 2b, as the locator pin 26 is driven into the aperture 28, the tab 24 and clip 22 are further directed towards each other into a positively locking engagement. Thus when the clip 22 and tab 24 engage each other, the driver side lower panel 12 and the elongated member 14 are kept in contact with each other after the collision thus enhancing the energy absorbing capabilities of the instrument panel assembly 10.

With reference again to FIG. 1, a first preferred embodiment is illustrated. In the first preferred embodiment, the elongated member 14 is an energy absorbing structure 18, extending outwardly from the instrument panel reinforcement bar 16 to the lower panel 12. As shown in FIGS. 1-2b, the clips 22 are disposed on the energy absorbing structure 18, and are registered to lockingly engage corresponding tabs 24 disposed on the driver side lower panel 12. As the instrument panel assembly 10 is forced into contact with the energy absorbing structure 18, the clips 22 and tabs 24 are locked together and keep the driver side lower panel 12 in contact with the energy absorbing structure 18 even after impact.

In a second preferred embodiment, the elongated member 14 is a knee bolster bracket 20. The knee bolster bracket 20 serves primarily to hold the inflatable knee airbag in place or where an inflatable knee airbag is not provided a knee bolster panel. The clip 22 and tab 24 arrangement may be located on the knee bolster structure wherein one of either the clip 22 or the tab 24 is fixed on the knee bolster structure and the other of the clip 22 or tab 24 is disposed on the lower panel 12. The operation of the clip 22 and tab 24 arrangement is the same as previously described. Thus when an occupant drives the lower panel 12 towards the instrument panel reinforcement bar 16, the clip 22 which is registered to the tab 24 lockingly engage each other. As the clip 22 and tab 24 come into contact with each other they become positively lockingly engaged with each other so as to keep the driver side lower panel 12 in contact with the knee bolster bracket 20 and thus increase the energy absorbing structure 18 qualities of the instrument panel assembly 10.

As shown in FIG. 4a, the clip 22 and tab 24 may fixed onto the lower panel 12 by a device such as a screw 31. This allows for the clip 22 tab 24 arrangement to be tunable so as to better enhance the registration of the two to each other. Typically, the energy absorbing structure 18 and the knee bolster bracket 20 are made from a metal, thus either the tab 24 or clip 22 may be stamped in accordance with industry standards onto either of the energy absorbing structure 18 or the knee bolster bracket 20.

Figure 3A:
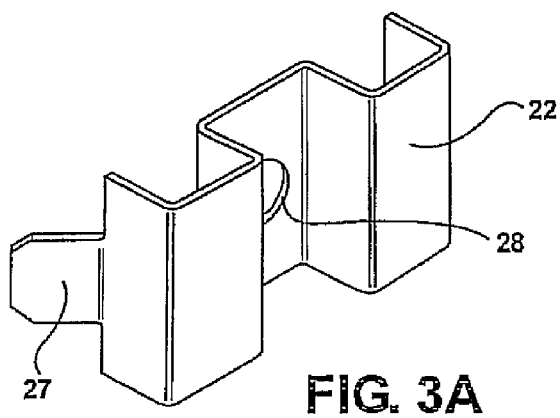
FIG. 3a is a perspective view of the clip.
Figure 3B:
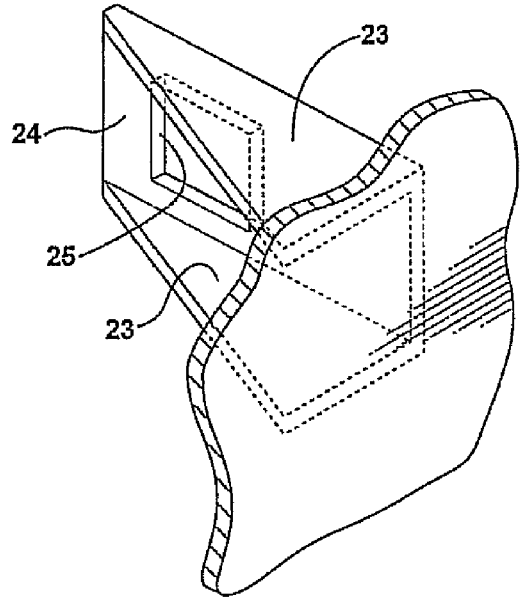
FIG. 3b is a perspective view of the tab.

With reference now to FIGS. 4a and 4b, the operation of the clip 22 tab 24 arrangement is illustrated. The clip 22 or tab 24 may be made from a material such as a polypropylene or other types of plastics as well as steel, and may be vibrationally welded onto the driver side lower panel 12. FIG. 4a shows the clip 22 spaced apart from and registered in alignment with the tab 24 and FIG. 2 shows the clip 22 lockingly engaged with the tab 24 after impact. An isolated view of the clip 22 and tab 24 are provided in FIGS. 3a and 3b, respectively. The tab 24 has a tab opening 25 configured to receive the clip disposed between a pair of support walls spaced apart from each other. The support walls 23 help maintain the position of the clip 22 as the tab 24 engages the clip 22 and also helps the tab 24 remain fixed to the panel after impact. The clip 22 includes a flange 27. The flange 27 is resilient and returns to its natural position. Thus when the clip 22 is pushed up against the tab 24 the flange 27 of the clip 22 will yield and pass into the tab opening 25. The resiliency of the flange 27 returns to the flange 27 to its natural position and thus engagingly locks the clip 22 to the tab 24. Thus the clip 22 and tab 24 are positively locked with respect to each other. The embodiment described herein is not to be read as a limitation to the arrangement or configuration of the clip 22 or tab 24. Thus an instrument panel assembly 10 is provided wherein the driver side lower panel 12 is removable from the instrument panel assembly 10 so as to allow maintenance to be performed on the structural parts of the vehicle that are housed behind the instrument panel yet allows the lower panel 12 of the instrument panel assembly 10 to lockingly engage with the instrument panel assembly 10 so as to increase the energy absorbing qualities of the instrument panel upon a collision.

The invention claimed is:

1. An instrument panel assembly mounted in an interior compartment of a vehicle, the instrument panel assembly comprising:

an instrument panel reinforcement bar fixedly mounted to the vehicle, an elongated member, the elongated member having a fixed length and is fixedly mounted to the instrument panel reinforcement bar;

a lower panel having an inner surface opposite an outer surface, the outer surface exposed to the interior compartment of the vehicle, the lower panel spaced apart from the elongated member;

at least one clip having an aperture disposed between a pair of generally parallel walls, the walls extending generally coaxially with a first axis, wherein each of the at least one clip is disposed on one of either the lower panel or the elongated member and movable along the first axis; and at least one tab and a locator pin, wherein each of the at least one tab and the locator pin is disposed on the other of the lower panel or the elongated member, and movable along the first axis, the locator pin includes a pin flange extending away from a beveled head, the locator pin is registered to engage the aperture of the clip so as to facilitate the locking engagement of each of the at least one clip to each of the at least one tab, each of the at least one tab spaced apart from and registered to a respective one of each of the at least one clip, and wherein each of the at least one clip and each of the at least one tab are configured to lockingly engage each other so as to fix the lower panel relative to the instrument panel reinforcement bar when the lower panel and elongated member are driven into contact with each other along the first axis, and prevent the lower panel from separating from the elongated member.

2. The instrument panel assembly as set forth in claim 1 wherein each of the at least one tab is vibrationally welded to one of either the elongated member or the lower panel and each of the at least one clip is vibrationally welded to the other of the elongated member or lower panel.

3. The instrument panel assembly as set forth in claim 1 wherein the at least one tab is fixed to the elongated member using a screw so as to be tunable, and the at least one clip is fixed to the lower panel so as to be tunable.

4. The instrument panel assembly as set forth in claim 1, wherein the elongated member is one selected from the group consisting of an energy absorbing structure and a knee bolster bracket.

5. The instrument panel assembly as set forth in claim 4 wherein the at least one clip is disposed on one of either the lower panel or the energy absorbing structure; and the at least one tab is disposed on the other of the lower panel or the energy absorbing structure so as to be spaced apart from and registered to each of the at least one clip, and wherein each of the at least one clip and each of the at least one tab are configured to lockingly engage each other so as to keep the lower panel in a fixed relationship with the instrument panel reinforcement bar when the at least one clip engages the at least one tab.

6. The instrument panel assembly as set forth in claim 1, wherein the clip includes a base and a side wall extending generally orthogonal to the base, and a clip flange angled relative to the side wall, the tab having an opening configured to receive the clip flange.

\* \* \* \* \*

UNITED STATES PATENT AND TRADEMARK OFFICE
CERTIFICATE OF CORRECTION

| | |
|---|---|
| PATENT NO. | : 8,181,991 B2 |
| APPLICATION NO. | : 12/469717 |
| DATED | : May 22, 2012 |
| INVENTOR(S) | : Haruyuki Dei et al. |

It is certified that error appears in the above-identified patent and that said Letters Patent is hereby corrected as shown below:

In the Specification

At column 2, line number 26 Delete "engaged" Insert -- engage --

At column 3, line number 28 Delete "positively" Insert -- positive --

At column 4, line number 23 After may, Insert -- be --

Signed and Sealed this
Third Day of June, 2014

Michelle K. Lee
*Deputy Director of the United States Patent and Trademark Office*